United States Patent [19]

Chow et al.

[11] Patent Number: 5,564,121
[45] Date of Patent: Oct. 8, 1996

[54] MICROCELL LAYOUT HAVING DIRECTIONAL AND OMNIDIRECTIONAL ANTENNAS DEFINING A RECTILINEAR LAYOUT IN A BUILDING

[75] Inventors: Peter E. Chow, Dallas; Ali K. Karim; Victor Fung, both of Plano, Tex.

[73] Assignee: Northern Telecom Limited, Montreal, Canada

[21] Appl. No.: 292,275

[22] Filed: Aug. 18, 1994

[51] Int. Cl.$^6$ ................................. H04B 1/04
[52] U.S. Cl. ..................... 455/53.1; 455/63; 455/129
[58] Field of Search ............................ 455/33.1, 33.2, 455/33.3, 33.4, 53.1, 54.1, 54.2, 56.1, 51.2, 63, 277.1, 277.2, 272, 129; 379/59, 58, 63; 370/24, 29, 36; 342/368, 371

[56] References Cited

U.S. PATENT DOCUMENTS

| | | | |
|---|---|---|---|
| 4,128,740 | 12/1978 | Graziano | 455/33.1 |
| 4,144,496 | 3/1979 | Cunningham et al. | 455/33.3 |
| 4,790,000 | 12/1988 | Kinoshita | 379/59 |
| 4,932,049 | 6/1990 | Lee | 379/60 |
| 5,038,403 | 8/1991 | Leitch | 455/51.2 |
| 5,067,147 | 11/1991 | Lee | 379/60 |
| 5,109,527 | 4/1992 | Akerberg | 455/33.2 |
| 5,178,878 | 12/1992 | Davis et al. | 455/277.1 |
| 5,181,200 | 1/1993 | Harrison | 455/33.2 |
| 5,212,830 | 5/1993 | Miller | 455/33.1 |
| 5,235,632 | 8/1993 | Raith | 455/33.1 |
| 5,349,631 | 9/1994 | Lee | 455/33.1 |
| 5,355,520 | 10/1994 | Freeburg et al. | 455/63 |

FOREIGN PATENT DOCUMENTS 0429200  5/1991  European Pat. Off. .
9107043  5/1991  WIPO .

OTHER PUBLICATIONS

A. J. Motley et al., "Reduced Long–Range Signal Reception With Leaky Feeders", Electronics Letters, Sep. 1, 1983, vol. 19, No. 18, pp. 714–715.

Saleh et al., "Distributed Antennas For Indoor Radio Communications", IEEE Transactions On Communications, vol. COM–35, No. 12. Dec. 1987, pp. 1245–1249 & 1251.

V. H. Mac Donald, "The Cellular Concept", The Bell System Technical Journal, vol. 58, No. 1, Jan. 1979, pp. 15–41.

Bernhardt, "Macroscopic Diversity in Frequency Reuse Radio Systems," IEEE Journal on Selected Areas in Communication, vol. 5, No. 5, Jun. 1987, pp. 862–870.

Cox, "Universal Digital Portable Radio Communications," Proceedings of the IEEE, vol. 75, No. 4, Apr. 1987, pp. 436–477.

Sundberg, "Alternative Cell Configuration for Digital Mobile Radio Systems," Bell System Technical Journal, vol. 62, No. 7, Sep. 1983, pp. 2037–2065.

Primary Examiner—Andrew Faile
Attorney, Agent, or Firm—Foley & Lardner

[57] ABSTRACT

A radio communication system is provided wherein radio coverage building blocks are used to provide uniform radio coverage to rectilinear floor layouts of buildings. The building blocks are comprised of directional and omnidirectional antennas which are applied to rectangular and irregular layouts. Each building block is divided into multiple small zones and each zone is covered by an antenna. Each antenna in the building block is connected to the same base station through a low loss coupling matrix and all antennas transmit and receive simultaneously. The directional antennas are located near the boundary of the service area. An omnidirectional or directional antenna at the center of the zone may be used to fill the rest of the area.

9 Claims, 2 Drawing Sheets

MICROCELL LAYOUT HAVING DIRECTIONAL AND OMNIDIRECTIONAL ANTENNAS DEFINING A RECTILINEAR LAYOUT IN A BUILDING

BACKGROUND OF THE INVENTION

Radio propagation in cellular systems will from time to time suffer from fading and co-channel interference problems. Fading is caused by multipaths, i.e. the transmitted signal arrives at the receiver via a number of paths, each of which will have different path lengths. In a point to point microwave application, the fade will occur for 1% of the time or less. The effects of the fades can be reduced by increasing the transmitted power, equalizing the faded received signal or applying frequency, space or receiver diversity.

Cellular applications have more problems than line of sight microwave because of the wide area of coverage and mobile traffic. Also, line of sight propagation can never be guaranteed in cellular applications.

In today's cellular application where a 100 to 200 feet antenna tower will cover an area from 1 up to 10 miles in radius, the propagation path loss from a point to another point in the same cell could vary by as much as 100 db or more. The transmit power has to be high enough to cover any possible loss. This not only wastes power, but in the worst case, the interference propagation path loss to other cells may not be as high as the path loss in the same cell, thus causing interference and affecting the performance of other cells. Thus, increasing the transmit power does not necessarily solve the problem.

When the application moves to a smaller cell or serving area, interference problems do not disappear simply because of a lower antenna height (20 to 50 feet or 8 to 12 feet for indoor environment). Statistically, the propagation path loss is equivalent to the large serving area, and the problems remain proportional. In addition, an indoor environment introduces further obstacles like walls and furniture.

The other common problem, as indicated above, in today's cellular systems is interference directed to co-channel cells. At present, each cell in a cellular system is covered by a single omnidirectional antenna located at the center of the cell or by a directional antenna for each sector in a sectorized cell. The signal transmitted from each antenna relies only on the terrain or propagation loss to limit the interference to the co-channel cells. However, with the emerging indoor Microcellular communication, a centralized omnidirectional antenna approach might not provide effective coverage and interference control due to the irregular layout of the building.

DESCRIPTION OF THE PRIOR ART

The cellular scheme proposed by V. H. MacDonald, "The Cellular Concept", *Bell System Technical Journal*, pp. 15–41, Jan. 1979, has been used in wireless mobile telephones for over a decade. This fundamental concept is frequency reuse. The idea of frequency reuse is to divide a fixed number of radio channels into a number of sets. Each set is allocated to a given area (cell) served by a base station. The channels are then reused in other cells some distance away. The distance at which channels can be reused is governed by the carrier-to-interference ratio, the ratio of the desired signal received by the portable terminal to the interference received from other cells using the same frequency. A cell is generally covered by a base station's omnidirectional antenna located at the cell center. In the case of a sectorized system, each cell is divided into sectors (typically three or six per cell). Each sector uses a subset of the cell's frequencies and is served by a directional antenna in one corner of the sector. The radio signals from the antennas are electromagnetic waves which are subjected to propagation loss due to the environment. As indicated above, in order to cover the cell with a desired signal level, adequate power has to be transmitted through the antenna to overcome the propagation loss. Higher power will be required to provide a larger coverage area or to penetrate inside buildings. However at some point, the transmitted power might reach the power capability of the system or the safety limit, and even at this maximum level, some locations still would not be covered with adequate signal strength. Also with higher power, higher interference will be generated thus affecting users in co-channel cells.

It is therefore desirable to provide good coverage without relying on high transmitted power. A known approach is to split the cell into smaller cells to reduce the transmitted power as well as the interference. However this approach is expensive because it requires more base station equipment and facilities. Also for smaller cell size, the propagation characteristics will be different and the carrier to interference ratio will deteriorate.

Another approach is to use distributed antennas. This means that instead of reducing the cell size, the coverage area of each antenna is reduced by using more than one antenna in the cell. A distributed antenna system can cover the same area as a single antenna system while radiating less power. This in turn decreases the interference to other cells due to lower radiated power. In Saleh et al's "Distributed Antennas for Indoor Radio Communications", *IEEE Transactions on Communications*, Vol. COM-35, pp. 1245–1251, Dec. 1987, there is described the use of distributed monopole antennas in buildings. Saleh concludes that conventional single central antenna system in buildings will have large multipath delay spread, require high power to cover the whole building and produce high interference. His measurement results show that the delay spread and power attenuation are lower for a distributed monopole antenna system than for a single antenna system. However, no reference is made on how the interference can be confined nor does he provide any method of deploying the distributed antenna system which is crucial in providing uniform coverage to the building.

A different form of distributed antenna, a leaky feeder system, is described by A. J. Motley, and D. A. Palmer, "Reduced Long-Range Signal Reception with Leaky Feeders", *Electronics Letters*, vol 19, pp. 714–715 to reduce the interference to the outside. The performance of a leaky feeder in building was measured and it was found that leaky feeders can enhance coverage and also reduce interference reception compared to using a single antenna. However, a leaky feeder will produce interference like distributed omnidirectional antennas and is more expensive than a distributed antenna system. Also a leaky feeder has higher cable loss and thus requires higher transmitted power in order to provide adequate coverage to the whole building.

U.S. Pat. Nos. 4,932,049 and 5,067,147 which issued to W. C. Y. Lee describe the use of distributed antennas to enhance the carrier to interference ratio in cellular applications. Lee suggests dividing a cell into three small zones, which are approximately elliptical. Each zone has a minor axis which is equal or greater than the radius of the cell. The antenna can be located at the center of the zone or at the edge of the zone. There are two approaches in the design. In the first one, called the selective approach, all three zones receive the signal from the mobile and only the zone transmitter with the strongest received signal is turned on. This approach requires additional hardware for the controller and the zone selection. In the second approach, called the non-selective approach, all transmitters are turned on and no zone selection is required. The same frequencies are used in all three zones. Lee does not address the implementation of the system in a standard rectangular or an irregular floor layouts since the described system will not provide optimal coverage to layouts other than circular cells.

There is accordingly a need for a method and system for improving the RF coverage and minimizing the co-channel interference of in-building layouts which contain rectangular or irregular layouts.

SUMMARY OF THE INVENTION

The system according to the present invention makes use of building blocks comprised of directional and omnidirectional antennas which are applied to rectangular and irregular layouts. Each building block is divided into multiple small zones and each zone is covered by an antenna. Each antenna in the building block is connected to the same base station through a low loss coupling matrix and all antennas transmit and receive simultaneously. The directional antennas are located near the boundary of the service area. An omnidirectional or directional antenna at the center of the zone may be used to fill the rest of the area.

According to an aspect of the present invention, there is provided an antenna configuration for providing uniform radio coverage to predetermined rectilinear floor layout of a building, comprising:

a number of directional antennas providing radio coverage defining a radio coverage building block, wherein a building block conforms to said rectilinear floor layout of said building, each directional antenna being positioned so as to define a corner boundary of said radio coverage building block, adjacent directional antennas forming rectilinear boundaries of said radio coverage building block, said directional antennas being oriented in such a way as to provide radio coverage inwardly of said boundary; and an additional antenna generally located at the center of said boundary such that radio coverage can be provided to the center portion of said building block.

Another aspect of the present invention is to provide a radio communication system having an antenna configuration for providing uniform radio coverage to a predetermined rectilinear floor layout of a building, comprising:

a radio base station for providing radio service to said floor layout of said building;

a number of directional antennas providing radio coverage defining a radio coverage building block, wherein a building block conforms to said rectilinear floor layout of said building, each directional antenna being positioned so as to define a corner boundary of said radio coverage building block, adjacent directional antennas forming rectilinear boundaries of said radio coverage building block, said directional antennas being oriented in such a way as to provide radio coverage inwardly of said boundary;

an additional antenna generally located at the center of said boundary such that radio coverage can be provided to the center portion of said building block; and an antenna matrix for connecting each antenna to said radio base station, such that the antennas can transmit and receive simultaneously on the same radio channel.

BRIEF DESCRIPTION OF THE DRAWINGS

The invention will be described in conjunction with the following drawings, in which.

DETAILED DESCRIPTION OF THE INVENTION

The principle of the invention is to cover an area requiring service with cells made up of identical building blocks of antennas. Each building block is divided into multiple small zones and each zone is covered by an antenna. Each antenna in the building block is connected to the same base station through a low loss coupling matrix and all antennas transmit and receive simultaneously. The same frequencies/channels are used in all zones within the same building blocks all the time and therefore no switching of transmitter or receiver is required. Also there is no hand-off within the cell for a portable moving from zone to zone. The two way communication between the portable and base station in each small zone is conducted through all antennas and in most cases the one antenna covering the zone containing the portable transmits and receives the strongest signal to and from the mobile. For non-square areas, the shape of the building blocks can be varied slightly, and for larger coverage areas, more building blocks might be required for the cell.

Figure 1:
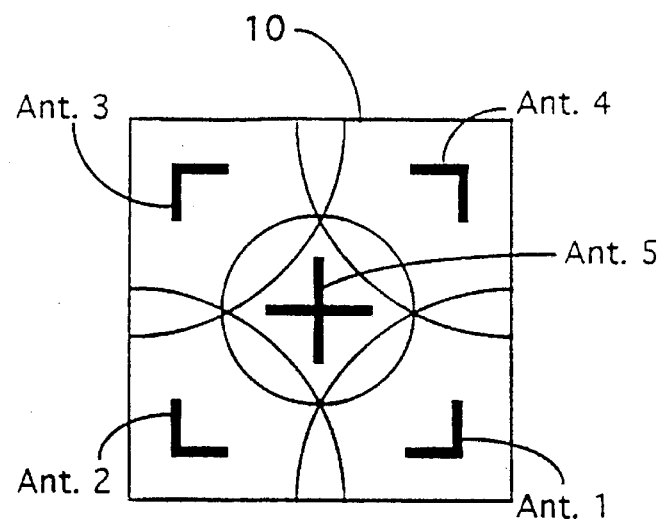
FIG. 1 is an illustration of a building block service area according to first embodiment of the invention.

As indicated above, for indoor microcell environments, the cell layout generally will not be a circle. A more typical layout will be rectangular in shape and the coverage outside the rectangular cell or building will be considered as interference to other co-channel users. Hence the objective of providing coverage for indoor microcell environments is to confine the signal within the rectangular area. Therefore, the building block of the system according to the present invention is designed to provide a square coverage area as shown in FIG. 1. A rectangular area can be covered by "stretching" the square building block to fit the coverage area or by using multiple building blocks of antennas.

Referring to FIG. 1, the boundary 10 forming the rectangular shaped cell is covered by 4 directional antennas (Ant. 1 to 4) which are oriented so that the main beam is directed towards the center of the cell. A fifth antenna (Ant. 5) which is omnidirectional is used to cover the center of the cell. The antennas are inset slightly from the corners of the cell to make use of the back lobes of the antenna pattern to increase coverage into the corners of the cell. Although in practice the coverage area will not be a perfect square due to multipath and the non-ideal antenna pattern, the use of directional antennas in the building blocks provide much better interference control than the use of distributed omnidirectional antennas. Each antenna in the building block is connected to the base station through simple splitters/combiners or other means and all antennas transmit and receive simultaneously. Splitters/combiners for this type of application are commercially available from Mini Circuits of Brooklyn, N.Y.

In the preferred embodiment, the cell building block is made up of an omnidirectional antenna 5 located at the center of the building block's coverage area and a distributed antenna system comprising four directional antennas 1, 2, 3 and 4. The directional antennas approximate a square antenna pattern by being located near the corners of the coverage area and oriented at a 45 degree angle from the walls so that the radiated signal is directed inwardly toward the center of the coverage area. Directional antennas such as described herein are commercially available from Decibel Systems of Dallas, Tex.

Figure 2:
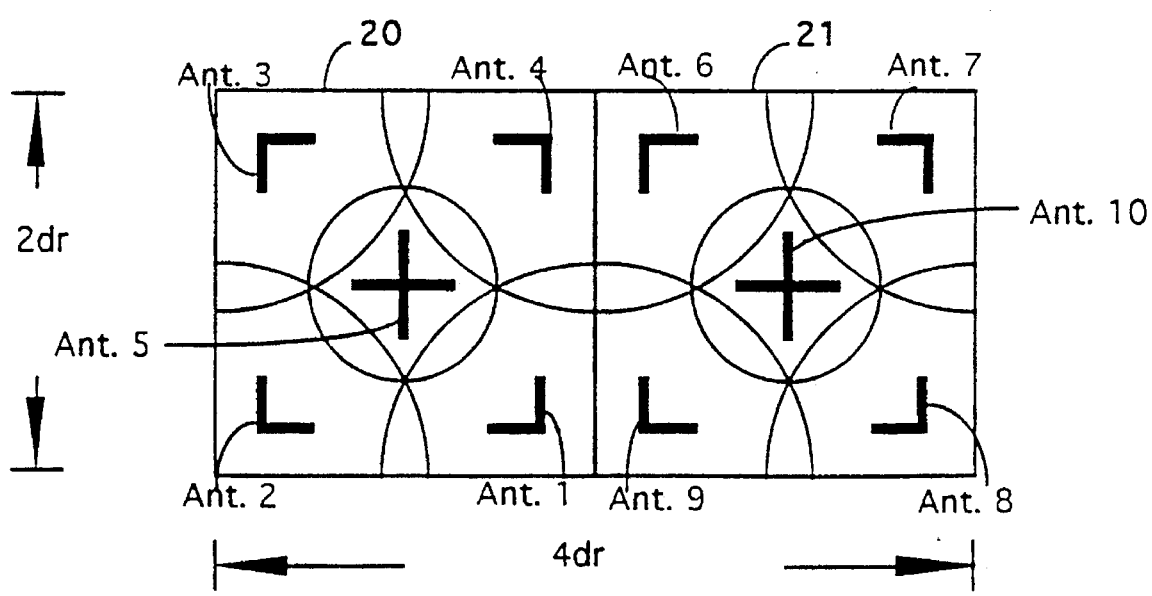
FIG. 2 is an illustration of multiple service areas according to another embodiment of the invention.

An example rectangular building layout with width to length ratio of $2d_r$ to $4d_r$ is shown in FIG. 2. If we consider that the longest axis of the building is the diameter (length) of the cell, then $2d_r$ is the radius (width) of the cell. Two building blocks 20 and 21 as shown in the figure will be required to cover the area. Directional antennas 1, 2, 3, 4 cover the boundaries of block 20 and together with omnidirectional antenna 5 form the first building block 20. Directional antennas 6, 7, 8, 9 cover the boundaries of block 21 and together with omnidirectional antenna 10 form the second building block 21. The dimensions of the building block can be varied to fit the layout of the building. For example, an extended corridor in a building could receive service coverage by adding blocks of cells along the length of the corridor. More building blocks can be used for buildings with different layouts. The building block provides a basic unit to cover the building with good interference control.

Figure 3:
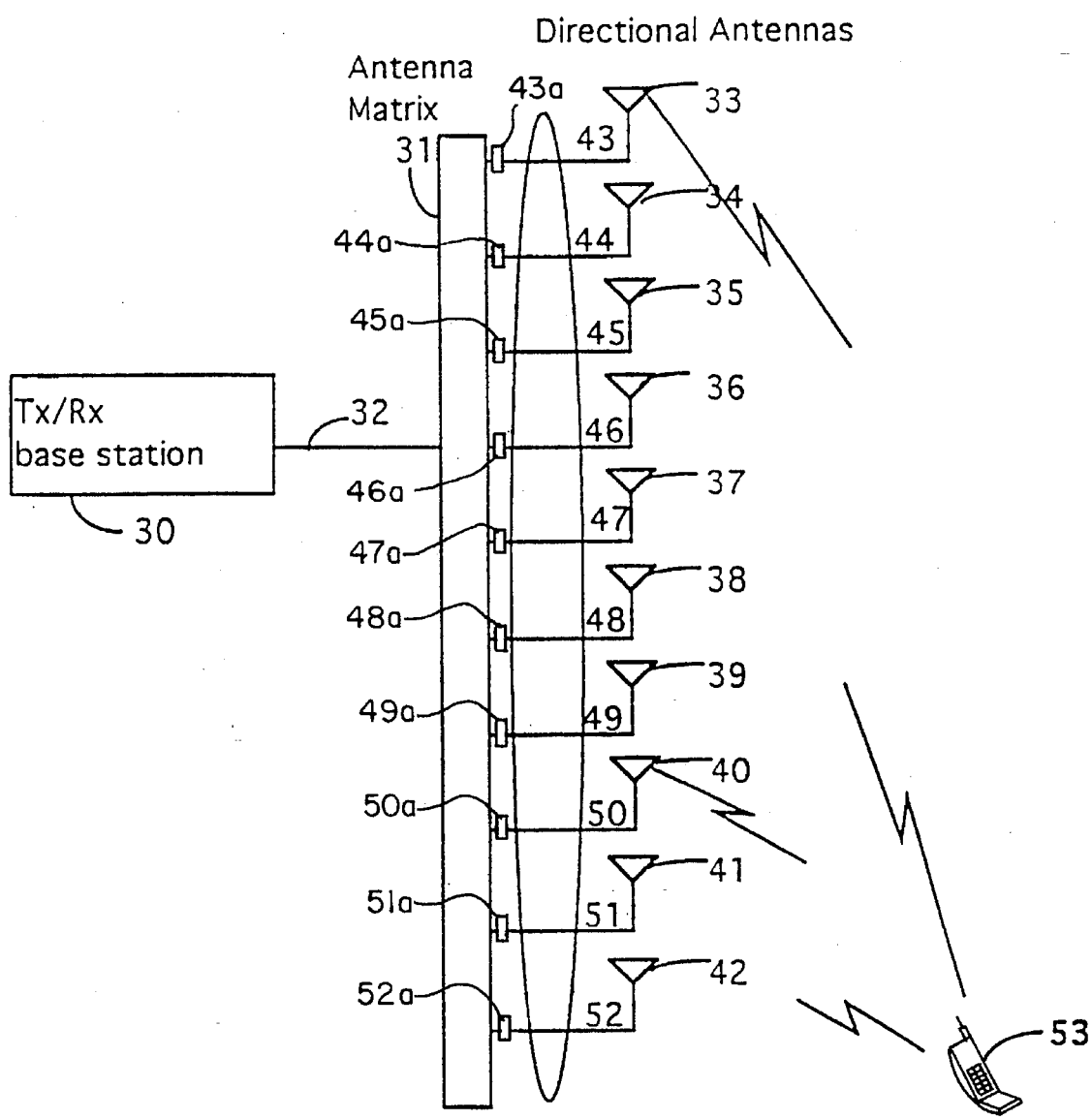
FIG. 3 is a block diagram of the antenna network required to provide service to the service areas shown in FIGS. 1 and 2.

FIG. 3 illustrates the basic components used to form the cell building blocks of FIG. 2. If more building blocks comprising more antennas are needed, a matrix with more ports can be used. If the coverage area is too large, or the number of antenna matrix ports become too large, then the building would have to be covered by more than one cell, i.e. more than one Tx/Rx base station and antenna matrix complex, each having multiple building block serving areas. In this case, handoff would be required for portables moving from one cell's serving zone to another cells serving zone. Typically, one base station's Tx/Rx antenna matrix should cover 1 to 2 floors of a building.

Referring to the FIG. 3, the base station system 30 is connected to a coupling matrix 31 via coaxial cables or a microwave link 32. The matrix 31 can be co-located with the base station 30, or located at the antenna site to minimize the cable run if the base station 30 is not located at the cell. The outputs of the matrix 31 (control or voice channels) are connected to the distributed antennas 33 to 42 via coaxial cables or microwave links 43 to 52.

In the down link path, i.e. base to mobile, the signal is transmitted from the base station 30 via link 32 into antenna matrix 31. The signal from the output of the matrix is then transmitted to each zone via the matrix/antenna links 43 to 52 and antennas 33 to 42. In the uplink path, the signal is collected from each antenna and combined in matrix 31 and sent back to the base station 30. Since different cable or link loss is experienced at each antenna due to different distances from the base station, it may be necessary to balance the loss by adding attenuators 43a to 52a to the links having the lowest loss so that approximately equal power is transmitted from each antenna.

In comparison to conventional single omnidirectional antenna and distributed omnidirectional antenna systems, the invention provides a much lower level of interference to regions outside of each serving cell. This means that the frequencies can be reused at much closer distances, thus allowing a higher re-use factor and higher capacity.

The system of the present invention also provides a simplified method of deploying the antenna system through the use of building blocks. More importantly, the building blocks can be tailored into most of the indoor layouts and cell shapes while still reducing interference. With the use of multiple antennas with smaller coverage area, the transmitted power requirement is reduced in comparison to a single omnidirectional antenna system. The dynamic range (the ratio of the maximum to the minimum received signal within the cell) will also be reduced due to smaller coverage areas.

What is claimed is:

1. A radio communication system for providing a radio communication service within a predetermined rectangular region, the system comprising:

a radio transceiver being operable to communicate on a radio channel;

an array of antennas, the array comprising a plurality of directional antennas, each directional antenna being disposed at a respective location on a boundary of the rectangular region and being aimed inwardly of the boundary; and a coupler for coupling said radio transceiver to each antenna of the antenna array, such that said radio transceiver can communicate on said radio channel using all of the antennas of the antenna array simultaneously.

2. A radio communication system as defined in claim 1, wherein the respective location of each directional antenna is a respective corner of the rectangular region.

3. A radio communication system as defined in claim 2, wherein the array comprises an additional antenna disposed centrally in the rectangular region.

4. A radio communication system as defined in claim 3, wherein the additional antenna is an omnidirectional antenna.

5. A radio communication system as defined in claim 1, wherein the coupler comprises at least one attenuator for adjusting a transmission power of a radio signal transmitted by an antenna of the array.

6. A radio communication system as defined in claim 1, further comprising an additional array of antennas for providing the radio communication service to an additional rectangular region, the coupler being operable to couple said radio transceiver to each antenna of the additional antenna array, such that said radio transceiver can communicate on said radio channel using all antennas of both antenna arrays simultaneously.

7. A method for operating a radio communication system to provide a radio communication service within a predetermined rectangular region, the method comprising:

providing a radio transceiver being operable to communicate on a radio channel;

providing an array of antennas, the array comprising a plurality of directional antennas, each directional antenna being disposed at a respective location on a boundary of the rectangular region and being aimed inwardly of the boundary;

coupling said radio transceiver to each antenna of the antenna array; and operating said radio transceiver to communicate on said radio channel, said radio channel using all of the antennas of the antenna array simultaneously.

8. A method as defined in claim 7, wherein the directional antennas are provided at respective corners of the rectangular region.

9. A method as defined in claim 8, further comprising providing an additional antenna at a location which is centrally disposed in the rectangular region and coupling each radio transceiver to the additional antenna.

* * * * *